United States Patent [19]
Breton

[11] 3,807,429
[45] Apr. 30, 1974

[54] THERMODYNAMIC STEAM TRAP

[75] Inventor: Guy Georges Rene Breton, Laval, Quebec, Canada

[73] Assignee: Velan Engineering Ltd., Montreal, Quebec, Canada

[22] Filed: June 2, 1971

[21] Appl. No.: 149,233

[30] Foreign Application Priority Data
Apr. 16, 1971 Canada.......................... 110,612

[52] U.S. Cl.............. 137/183, 29/157.1 R, 137/359
[51] Int. Cl............................................... F16t 1/16
[58] Field of Search........ 137/183, 359; 29/157.1 R, 29/156.7 A

[56] References Cited
UNITED STATES PATENTS

| | | | |
|---|---|---|---|
| 1,838,160 | 12/1931 | Smith.......................... | 29/156.7 A X |
| 3,433,243 | 3/1969 | Schroder et al..................... | 137/183 |
| 2,989,976 | 6/1961 | Kinderman et al................. | 137/183 |
| 3,162,208 | 12/1964 | Curatola............................. | 137/183 |
| 3,664,363 | 5/1972 | Miyawaki........................... | 137/183 |

*Primary Examiner*—Alan Cohan
*Assistant Examiner*—Gerald A. Michalsky

[57] ABSTRACT

A thermodynamic steam trap of the disc type having an integral body and seating surfaces, in which the body proper is of a conveniently weldable metal and the seating surfaces are of a hard erosion resistant metal seat material not suitable itself for a body with welded connections.

1 Claim, 3 Drawing Figures

PATENTED APR 30 1974 3,807,429

INVENTOR
Guy Georges Rene BRETON

*Alan Swabey*
ATTORNEY

INVENTOR
Guy Georges Rene BRETON

ATTORNEY

THERMODYNAMIC STEAM TRAP

BACKGROUND OF THE INVENTION

This invention relates to steam traps.

1. Field of the Invention

More specifically, it relates to the type of thermodynamic steam trap which employs an orificed seat against which there operates a sealing disc. The sealing disc works according to the well-known Bernoulli effect, being unseated to allow the escape of condensate from the steam line and seated to prevent the escape of steam. One of the requirements of such a trap is long life, since it is often being in an inaccessible place where it is difficult, if not impossible, to replace the disc or seat. So, the disc and seat must be highly resistant to wear and erosion.

2. Description of Prior Art

One way of overcoming this problem is by casting or forging a one-piece body including a seat part, then hardening the seat part by heat-treatment. A shortcoming of this expedient is that the heat-treatable alloy which has to be used for the seat is one which is undesirable for welding of the trap connections. (For example a Martensitic stainless steel with a carbon steel). Consequently, the trap has to have a threaded joint for mating with a companion part of the steam line.

Another way of overcoming the problem is to make the body of the trap and a seat cap, as separate parts. A shortcoming of this construction is that complex gaskets have to be employed to provide a tight joint between the seat cap and body parts. Apart from the undesirability of a joint of this type, where fluid pressure is involved, the problem is compounded by the fact that the seat member has channels and on both sides of which the gasket has to be placed. Further, the joint is in a position where it is subject to direct attack by expanding steam emerging under the seat member.

SUMMARY OF THE INVENTION

The applicant has now overcome these problems by providing a thermodynamic steam trap having an integral body and seat and in which the body is of weldable metal and the seat of a hard erosion-resistant metal which itself is not suitable for a body with welded connections. The integral construction is made possible by mating complementary body and cap parts which are to all intents and purposes integral, even though of different metals. More specifically, the body has a cylindrical seating head and inlet and outlet passages leading through the head to the seat, including a central passage in the cap part. The cap part has an annular recess spaced from the central passage to provide upstanding flanges having outer faces, constituting the seat adapted to receive the seating disc. Beneath the cap part is an annular passage separated from the annular recess in the seating disc by a wall in the cap part, provided with spaced-apart openings, constituting escape passages from the annular recess to the annular groove. Preferably, the annular passage is partly in the body part and partly in the cap part so that the transition from the cap part of the body part does not register directly with the outlet from the spaced-apart passages.

The invention also embraces a specially shaped casting and a specially shaped forging as intermediate cap and body parts respectively in the manufacture of a steam trap of the nature described, and also a method of manufacturing such a trap.

BRIEF DESCRIPTION OF DRAWINGS

Having thus generally described the invention, it will now be referred to more specifically by reference to the accompanying drawings, illustrating preferred embodiments and in which.

DESCRIPTION OF PREFERRED EMBODIMENTS

Figure 1:
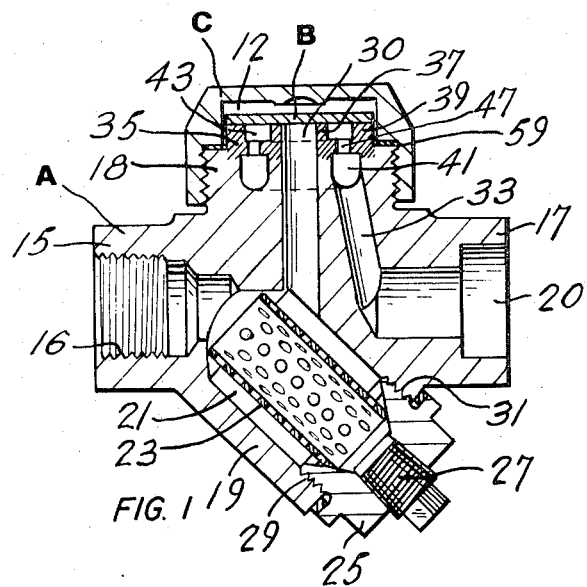
FIG. 1 is a vertical cross-section through a steam trap according to the invention.
Figure 2:
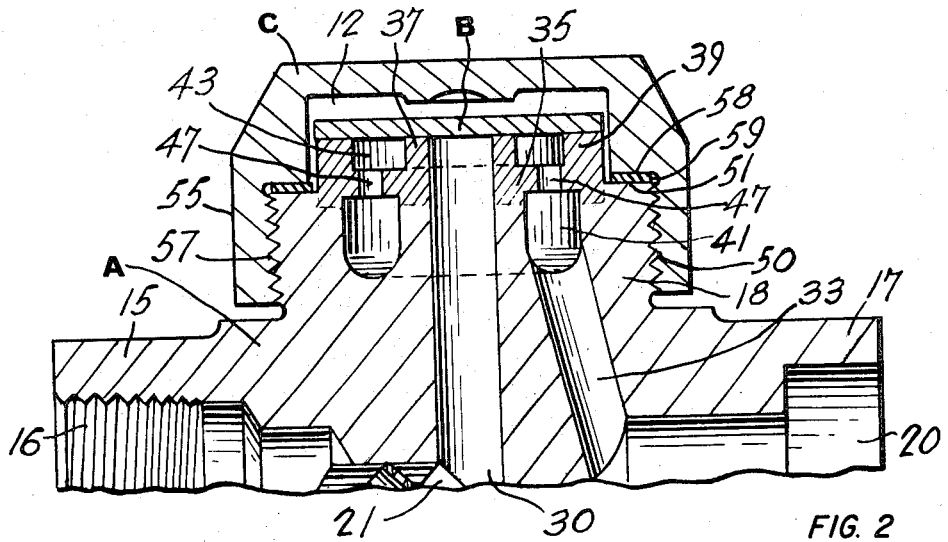
FIG. 2 is an enlarged fragmentary cross-section similar to that of FIG. 1, showing particularly the seating head part of the body.

Referring more particularly to the drawings, the preferred steam trap shown is made up of a body 1A, a sealing disc B and bonnet C, enclosing with the body a control chamber 12. The body A proper (identified by relatively coarse hatching) is of forged or cast conveniently weldable metal, for example a carbon steel or a chrome-molybdenum steel, while the smaller integral seating-cap (identified by finer hatching) is made from a hard, corrosion- and wear-resistant seat material, not suitable itself for a body with welded connections.

The body is of overall conventional outer shape, including aligned cylindrical laterally extending connection bosses 15 and 17, an upwardly extending cylindrical seating head 18 embodying the integral seating cap, and a diagonally extending optional strainer boss 19. The boss 15, where present, is provided with a passage 16 (shown threaded) and the boss 17 with an outlet passage 20 (shown unthreaded) adapted to welding. The boss 19 encloses a strainer chamber 21 containing a strainer 23. The end of the chamber 21 is provided with a closure member 25 of the shape shown, externally threaded as at 29 to engage with an internally tapped part 31 of the body A. A threaded central strainer holding plug 27 engages in the member 25.

The head 18 is of overall cylindrical shape having an outer wall 50 and an inwardly extending shoulder 51. The bonnet C is provided with a cylindrical wall 55 threaded on its inside, as at 57, to engage with the threaded wall 50 of the head 18. The bonnet C has an inwardly extending shoulder 58 juxtaposed to the shoulder 51 of the head 18 with a sealing gasket 59 intervening. This construction ensures that the chamber 12 is sealed from the outside.

The body A is provided with a central passage 30 extending from the extremity of the head 18 to the chamber 21. The body is also provided with a passage 33 leading from the passage 20 to an annular chamber 41 in the head 18. The annular chamber 41 is closed at its top by a web 35 forming part of the body cap and having an upper face bordered by spaced apart upstanding annular flanges 37 and 39 terminating in flat annular seating surfaces adapted to receive the sealing disc B in sealing relationship. The flanges 37 and 39, web 35 and disc B when seated enclose an annular chamber 41 and isolate it from the chamber 12, above the disc B. The web 35 is provided with spaced apart openings leading between the chamber 41 and the chamber 43 and when the disc B is unseated between the chamber 41 and the passage 30.

The flanges 37 and 39 thus constitute a seat for the disc B and with the associated chambers 41 and 43, the passages 47 between them and the connection with the chamber 41 and passage 30 and thus with the inlet and outlet of the trap (as described) permit the disc B under operating conditions of the trap in a steam line, to seat and unseat when subjected to the action of steam and condensate, according to the well known Bernoulli effect.

In accordance with the invention, the relatively small seating cap of the head 18 (fine shading) is effectively of one piece with the body proper of the trap (coarse shading). Unlike previous traps, the integral seating cap is made of hard wear-resistant seat material, not suitable itself for a body with welded connections, while the body proper is made of a relatively soft weldable metal.

In the preferred construction shown, this arrangement is brought about by integrally connecting a casting of the shape shown (finer hatching) to a body forging or casting of the shape shown (coarse hatching). This can be effected, for example, by brazing, or by a welding process, for instance, electron beam welding or inertia welding. To this end, the body proper, prior to integrating with the seating head is provided with a cylindrical recess having a bottom face provided with an inwardly extending annular groove and adapted to receive the under surface of the seating head and a cylindrical outer wall adapted to be juxtaposed to a lower shoulder of the cylindrical side wall of the seating head.

Preferably, the underside of the seating head is provided with an annular recess adapted to register with the annular groove in the body part so that together they form the annular chamber 41. The major depth of the chamber 41 is in the body proper and a minor depth in the seating part. In this way, the bottom face of the seating part and the bottom face of the recess in the body part abut at a position spaced from the outlet of each passage 47. This abutment is stepped away from the web 35, and thus removed from the position where escaping steam from chamber 43 expands to impinge on the wall of the annular chamber 41.

In integrating the cap and body parts, by brazing, a process known in the art, the surfaces to be juxtaposed are prepared by applying to one, or both, a powder of a brazing metal, for example a nickel-base filler metal. The cap and body are then assembled snugly together and the assembly subjected to brazing conditions, inlcuding heat treatment in a hydrogen atmosphere, as known in the art. Such a process provides an absolutely leak-proof joint at temperatures and pressures far higher than encountered by a steam trap in normal use, so that the body proper and cap are to all intents and purposes integral.

Figure 3:
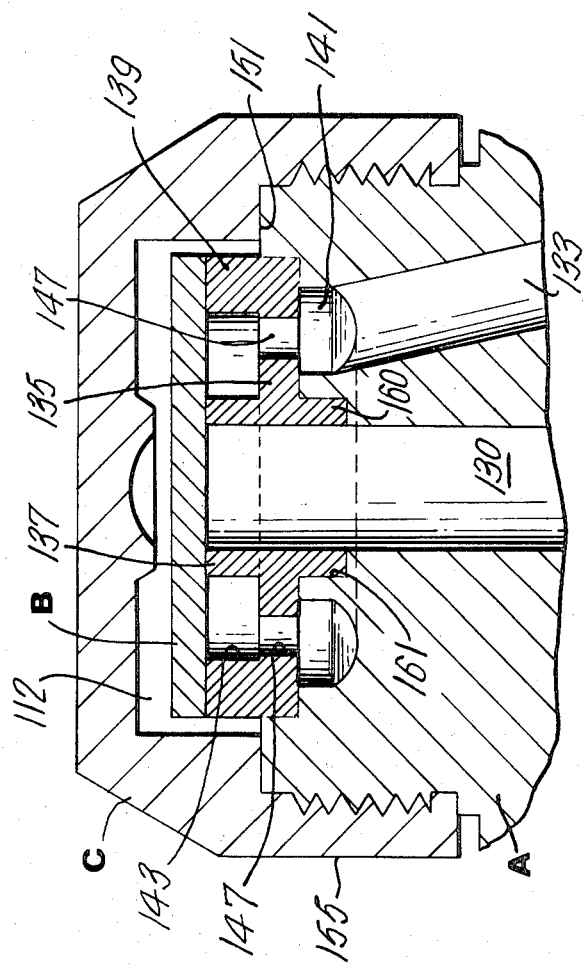
FIG. 3 is a still further enlarged fragmentary cross-section, similar to that of FIG. 2, showing the seating head part of the body, according to an alternative preferred embodiment.

An alternative preferred embodiment of the invention is shown in FIG. 3. Similar numbers have been given to the various parts which correspond to those in the previous Figure, except that they have been raised by one hundred. In this modified construction, the cap piece is provided with a central annular flange 160. The body piece is provided with a central annular recess 161 which receives the flange 160. The inner wall of the flange 160 forms a continuation of the wall of the central passage 130. The abutment of the surface of the flange 160 with the adjoining surface of the recess 161 is L-shaped. This is a particular advantage for brazing.

The metal from which the body piece may be made must be a conveniently weldable steel, for example, a carbon steel or a chrome-molybdenum alloy. The cap piece must be a hard erosion-resistant material, which, in itself, is not a suitable metal for a body with weldable connections. A preferred metal is "Stellite 6." The invention avoids the problems encountered with a compromise of using a metal which is either not weldable or only weldable with difficulty, and the seat hardened by heat-treating. Such metals are exemplified by Martensite stainless steel, for example, the 400 series.

This compromise leads to both the manufacturing difficulties and structural weaknesses. In manufacturing, a complicated drilling operation is required to provide the plurality of passages needed to obtain a balanced dynamic force under the disc, during the opening and closing periods. This balanced force is needed to prevent excessive local wear between the disc and the seating surface. Further, while the seating surfaces, in the compromise construction, are hardened, the surfaces of the openings through the flange leading to the chamber under the disc are not, so after a time, will erode and their size change, thus bringing wear-producing imbalance.

In the present construction, it is a simple matter to provide as many openings 47 as desired, preferably three or four, since they are formed in the cap piece before assembly. Further, because the openings are in the erosion-resistant metal, they remain accurately calibrated, so there is no source of imbalance to cause wear on the disc or seating surface.

I claim:

1. A disc-type thermodynamic steam trap, comprising, in combination:
    a body of a relatively readily weldable metal including inlet and outlet passage means,
    said body including a head portion having central passage means communicating with said inlet passage means
    said body having an annular chamber surrounding the inlet passage means in said head portion and communicating through passage means with said outlet passage means;
    a bonnet element having a portion forming a control chamber over said inlet passage means and secured to said head portion,
    said head portion including an annular shoulder and said bonnet including an inner shoulder in juxtaposed sealed relationship and closing the control chamber,
    said head portion including an outer annular recess depending into said head portion shoulder outwardly of the annular chamber,
    said recess having a bottom surface continuing radially inwardly of said annular chamber and intersecting a second annular recess depending axially of the central passage inwardly of the annular chamber and forming an offset therewith,
    a machined element insert of a comparatively hard erosion-resistant material having relatively difficult welding characteristics,
    said machined element having a lower surface complementary to the annular recesses and mated therein and defining inwardly and outwardly of the annular chamber L-shaped joints in cross-section respectively disposed at the control chamber and said central passage in which the base of the outer L-shaped joint intersects at an intermediate L-shaped joint at the top of the inner L-shaped joint, a web apertured to communicate with said annular chamber, said insert having a second annular chamber overlying the apertured web and communicating therewith, the second annular chamber defining inner and outer co-axial flanges having co-planar upper seating surfaces;

a sealing disc resting on said upper seating surfaces for displacement due to predetermined pressure-variations between the control chamber and said central passage, the complementary surfaces of said insert and body head member being intimately bonded at said L-shaped joints and complementary surfaces.

* * * * *